Nov. 6, 1962    F. H. RAYMOND ET AL    3,062,995

DIGITAL CONTROL SYSTEMS FOR MACHINE-TOOLS

Filed May 27, 1957

United States Patent Office 3,062,995
Patented Nov. 6, 1962

3,062,995
DIGITAL CONTROL SYSTEMS FOR MACHINE-TOOLS
François Henri Raymond, Saint-Germain-en-Laye, and André Pierre Jeudon, Gentilly, France, assignors to Societe d'Electronique et d'Automatisme, Courbevoie, Seine, France
Filed May 27, 1957, Ser. No. 661,866
Claims priority, application France June 16, 1956
10 Claims. (Cl. 318—162)

The present invention relates to an improved digital control system for the automatic operation of such machine-tools as lathes and mills in accordance with a program which has previously been recorded upon a medium which may be read by mechanical means, such as for instance a tape which has been punched or otherwise marked, a magnetic tape, or the like. The said record has been prepared by a prior quantification of a curve which defines at any time the relative positions and displacements of the tool and the blank to be machined and is consequently made of a sequence of digital data in a predetermined code. In the following description it will be assumed that within the control system proper, the data will be expressed in the well known binary system of numeration. The data are sequentially read from the record and introduced into a digital computer associated with the machine-tool, wherein they are so processed as to produce the operative instructions for the various drives of the machine-tool. These instructions finally develop into control voltages for the servo-mechanisms driving the motors of the machine-tool. Consequently, there must be effected in the computer, in the first place a comparison between the computed relative position of the tool with respect to the blank and in the second place a digital-to-analogue conversion, in order to suitably ensure control of the said servo-mechanisms.

In order that such a digital control may be applied for any shape of work-piece, the said quantification of the curve relating the position of the tool and the blank must be effected with respect to speed changes impressed upon the tool as well as with respect to the changes of the coordinates of the curve, according to the modular features or shape of the work-piece to be machined. The recorded program must be so formed as to describe the model in space as well as in time. In conventional digital control systems, the said program includes coded instructions concerning the speeds of the various drives of the machine-tool. The decoded instructions thus give control voltages for the servo-mechanisms driving the motors of the machine-tool.

In order to reduce the length and importance of the recorded program, it has previously been proposed to have recourse to some kind of interpolation defining certain intermediate positions between each pair of positions determined by the corresponding pair of instructions in the recorded program. Most often, such an interpolation has been provided in the analogue part of the computer, viz. at the inputs of the speed control servo-mechanisms of the machine-tool. In such a case, an interpolation device receives in an analogue form a pair of successive positions from analogue stores and works according to a predetermined input/output transfer law for delivering during the time interval alloted in the machine-tool to pass from the first position to the second one, an output voltage consisting of the addition to the analogue voltage representing the said first position, a component voltage varying according to the said law until the analogue voltage value of the second position is reached. Such an interpolation may be objectionable from two points of views: it adds an additional rigidity coefficient in the system mainly as the application of the interpolation law does not ensure in any case a smooth passage from a portion of curve to the following one, and consequently such a smooth passage is left to the constitution of the recorded program proper; it can only be set for a special kind of work by the machine-tool, either, for instance, for a rough machining work (lower definition, higher speed of the work) or for a fine work (higher definition or accuracy, lower speed of the work).

In contrast the object of the present invention is to provide a digital control system for machine-tool which comprises a digital interpolation member, whereby the digital computer of the system operates at a rhythm determined by the digital groups of the recorded program and upon precomputed data in the said recorded program to deliver output signals for the drives of the machine-tool which include both speed and position correction instructions. The interpolation member is arranged to operate according to a plain parametric process adapted for a cubic law interpolation so that, when required, any pair of successive portions of the curve of the tool with respect to the blank (or vice-versa as the case may be) are automatically linked by a smooth transition therebetween. The interpolation member receives from the recorded program, in addition to data relating to initial coordinate values, parametric data of quantification enabling the computation, at a predetermined rhythm, of the speed instructions predicting the meeting points of the tool and the blank machined by the tool and defining by the succession thereof the quantified curve of the tool relatively to the blank, with respect to the space and time of the program. After each prediction computation by the interpolation member, the result is compared with the result of a measurement of the actual relative position between the tool and the said blank, at the time when the said prediction result is met, and a further member of the control system derives therefrom the position correction as required for controlling the servo-mechanisms of the machine-tool motors therewith. The digital mode which is thus obtained is decoded, viz. converted into an analog voltage thereof and the speed arithmetical value, which will be denoted hereafter as being the "modulus" of the speed is determined from a special instruction of the stored program when required. Of course there are provided as many computation paths, each including distinct special interpolation and comparing members, as are speed drives in the concerned machine-tool. These paths may be independently established and operated as the synchronism thereof may be ensured from the recorded program proper.

Before describing an illustrative embodiment of a control system according to the invention, a method of interpolation which may be advantageously used in such embodiments will be firstly described. A single control variable and interpolation therefor will be considered as each interpolation operation is distinct for each one of the control paths of the machine-tool, the interpolation parameter to be considered being common to all the paths.

Considering such a curve as defined by the relation:

(I) $$s = f(t)$$

unknown but graphically available, a number of discrete points thereof $x_1, x_2, x_3 \ldots x_n$ may be determined therein in correspondence to time instants $t_1, t_2, t_3 \ldots t_n$ and the quantification process applied thereto. In a system according to the invention, it may be thought advisable and feasible that the said time instants $t_1, t_2, \ldots, t_n$ are equidistant. The condition may be imposed that at no point the curve to be followed by the tool on the blank may be angular, so that the tangents of such points as $x_1, x_2, \ldots, x_n$ may be predetermined in order to avoid an discontinuity between successive segments of the curve.

For computing a tangent at a definite point of the curve such a relation as follows may be used:

(II) $$\dot{x}(t_n) = (x_{n+1} - x_{n-1})/(t_{n+1} - t_{n-1})$$

The portion of curve $x_1 x_2$, for instance, is determined by the ends $x_1$ and $x_2$ thereof and the values of the derivatives of the said curve at such ends, viz. $\dot{x}_1$ and $\dot{x}_2$. The more simple and broad manner of obtaining such a portion of curve is the result of a search for the cubic relation answering to such conditions, viz:

(III) $$x = A \cdot t^3 + D$$

Let $p$ be the interpolation parameter common to all paths of the machine-tool. The relation of Taylor, for instance will give for the curve portion $x_1 x_2$ the parametric relation of (IV) $$x_{(1,p)} = x_1 + p \cdot \dot{x}_1 + (p^2/2) \cdot \ddot{x} + (p^3/3) \cdot \dddot{x}_1$$

Let then be:

(V) $$\Delta x_1 = \dot{x}_1 + \ddot{x}_1/2 + \dddot{x}_1/6$$

$$\Delta^2 x_1 = \ddot{x}_1 + \dddot{x}_1$$

$$\Delta^3 x_1 = \dddot{x}_1$$

The relation (IV) may be re-written as follows:

(VI)
$$x_{(1,p)} = x_1 + p \cdot \Delta x_1 + \frac{p(p-1)}{2} \cdot \Delta^2 x_1 + \frac{p(p-1)(p-2)}{6} \cdot \Delta^3 x_1$$

In the form of relation (VI), the quantity $x_{(1,p)}$ is easy to compute from a recurrency operation, as defined by the following table:

*Table I*

| Progression tag | I | II | III | IV |
|---|---|---|---|---|
| 0 | $x_1$ | $\Delta x_1$ | $\Delta^2 x_1$ | $\Delta^3 x_1$ |
| 1 | $x_1 + \Delta x_1$ | $\Delta x_1 + \Delta^2 x_1$ | $\Delta^2 x_1 + \Delta^3 x_1$ | $\Delta^3 x_1$ |
| 2 | $x_1 + 2\Delta x_1 + \Delta^2 x_1$ | $\Delta x_1 + 2\Delta^2 x_1 + \Delta^3 x_1$ | $\Delta^2 x_1 + 2\Delta^3 x_1$ | $\Delta^3 x_1$ |
| 3 | $x_1 + 3\Delta x_1 + 3\Delta^2 x_1 + \Delta^3 x_1$ | $\Delta x_1 + 3\Delta^2 x_1 + 3\Delta^3 x_1$ | $\Delta^2 x_1 + 3\Delta^3 x_1$ | $\Delta^3 x_1$ |
| $p$ | relation (vi), second member | $\Delta x_1 + p\Delta^2 x_1 + \frac{(p-1)p}{2}\Delta^3 x_1$ | $\Delta^2 x_1 + p\Delta^3 x_1$ | $\Delta^3 x_1$ |

Each line in each column of this table is apparently obtained from the addition, to the preceding one of the content of the right-hand column, prior line, of the table. The content or Column IV remains constant.

An interpolation member of a control system according to the invention will operate according to such a process.

The data of the recorded programme will essentially consist of sets of such values as $\Delta$, $\Delta^2$, $\Delta^3$ for each variable and for the discrete values thereof as chosen by the programmer. The computation of such values of data may be merely made with a desk calculator of an ordinary kind as it will now be shown.

Starting from the relation (IV), the following relations may be written for $(p-1)$ points of interpolation between two values of $x$, for instance between $x_1$ and $x_2$:

(VII)
$$x_2 = x_{(1,p)} = x_1 + p \cdot \dot{x}_1 + \frac{p^2}{2} \cdot \ddot{x} + \frac{p^3}{6} \cdot \dddot{x}_1$$

$$\dot{x}_2 = \dot{x}_{(1,p)} = \dot{x}_1 + p \cdot \ddot{x}_1 + \frac{p^2}{2} \cdot \dddot{x}_1$$

and from the relations (VII), the following may be written:

(VIII)
$$\ddot{x}_1 = -\frac{2}{p} \cdot (\dot{x}_2 - \dot{x}_1) + \frac{6}{p^2} \cdot (x_2 - x_1 - p \cdot \dot{x}_1)$$

$$\dddot{x}_1 = +\frac{6}{p^2} \cdot (\dot{x} - \dot{x}_1) - \frac{12}{p^3} \cdot (x_2 - x_1 - p \cdot \dot{x}_1)$$

and from the relations (VII), with respect to the relation (V), it results that:

(IX)
$$\Delta x_1 = \dot{x}_1 + \frac{(1-p)}{p^2} \cdot (\dot{x}_2 - \dot{x}_1) + \frac{(3p-2)}{p^3} \cdot (x_2 - x_1 - p \cdot \dot{x}_1)$$

$$\Delta^2 x_1 = \frac{(6-2p)}{p^2} \cdot (\dot{x}_2 - \dot{x}_1) + \frac{6(p-2)}{p^3} \cdot (x_2 - x_1 - p \cdot \dot{x}_1)$$

$$\Delta^3 x_1 = \frac{6}{p^2} \cdot (\dot{x}_2 - \dot{x}_1) - \frac{12}{p^3} \cdot (x_2 - x_1 - p \cdot \dot{x}_1)$$

As, for each computation, $p$ is a constant (it may be modified within the computer as it will be herein after disclosed), the computation of the input data of the recorded program is effected by summations of products, which is easily effected with a desk calculator. The same will apply to the computation of the values $$\dot{x}_1 \text{ and } \dot{x}_{1+1}$$

for instance according to the relation (II) supra.

Referring now to the drawings, FIG. 1 shows an illustrative scheme of a digital control system according to the invention but for a single path of drive of the concerned machine-tool;

In the following disclosure, it may be understood that no specifically detailed technology will be considered as such technology is of practical use in the computer and automatic control of machine-tools techniques. Parts only of the technological gadgets will be ascertained as useful for the clear understanding of the invention.

Figure 1:
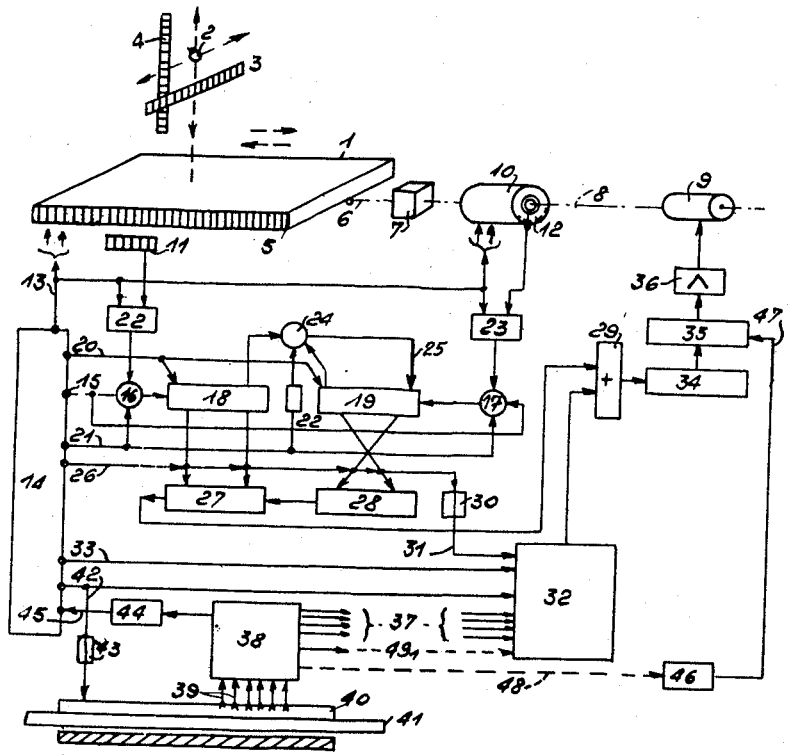

FIG. 1 shows the table of a milling-machine and it is the drive of this table 1 which will be more fully described. The tool-carrier is indicated by the center thereof 2 and the said carrier is displaced by a motor drive transversely with respect to the table, and parallel to a "scale" 3 which is fixed and bears suitable graduations, and it is also displaced vertically by a translation parallel to a further scale 4. To the table 1 is associated another "scale" 5 which moves with the table. To each "scale" is associated a reader which converts the measure into an electrical signal representative thereof. The readers associated with the fixed scales 3 and 4 will be carried by the tool-carrier and the reader 11 of the moving scale 5 is mounted in a fixed position. Various embodiments for such "scales" and readers therefor are known per se and an example will be described therefor with respect to the diagram of FIG. 3.

Referring back to FIG. 1, the table 1 moves along a shaft 6 driven through a reducing gear 7 from the shaft 8 of a driving motor 9. On the shaft 8 is carried a rotor of an encoder 10, for the rough measurement of the position of the table along the said shaft 6. Of course such an encoder of rough readings is associated with each one of the other driving shafts of the tool.

Each reading of the relative actual position between the tool and the blank will thus comprise two parts, one of which gives the rough position of the table with respect to the general drive thereof and the other will give within each one of the wide intervals defined by the first measurement, an accurate measure of the said position. In the scheme of FIG. 1, the rough measurement is given by the encoder 10—12 and the accurate measurement is given by the resolver 5—11. Actually the encoder is a resolver of the well-known rotating kind and the resolver associated to the table 1 is of similar kind but developed as concerns the windings thereof so as to extend in a linear fashion along the said table 1.

The electrical signals from the resolvers will be converted into digital informations so that the digital code of the measure will comprise the two parts as above defined: the first part thereof, representing the digits of higher weights of the quantity comes from the encoder 10—12, the second part thereof, representing the digits of lower weights of the quantity, comes from the linear encoder 5—11, and both these parts may be read merely in juxtaposition therebetween from an intermediate temporary register receiving both the said parts of the measured quantity. A condition for always ensuring the possibility of such a simple juxtaposition will be later defined.

The moving winding 5a (FIG. 3) of the resolver delivering the accurate measure of the position of the table 1 consists of a double-phased winding developed along the said table and the winding 11a for the reading thereof consists of a single-phase winding developed along a small length parallel to the winding 5a, and inductively coupled thereto. The encoder-resolver of rough measurement comprises a double-phased winding 10a inductively coupled to a single-phased winding 12a. An identical A.C. supply voltage from an output 13 of the time bases 14 of the system feeds both the said double-phased windings, in relative phase quadrature as it will be herein under explained. In each one of the single-phase windings a variable current is thus produced which gives a measure of the relative positions of the stater and rotor (or moving) member of the said resolvers.

At 22 for the accurate encoder, and at 23 for the rough encoder, control voltages are generated for respective gates, 16 for the accurate encoder, 17 for the rough encoder. Each signal picked up from the said encoders will have a time duration proportional to the value of the phase-shift detected therein and will make the said corresponding gate pass an input signal applied thereto provided an authorization signal is also present upon a further control input of the gate. The authorization signal issues, when required from the output 21 of the time bases 14.

From an output 15 of the said time bases 14 issues a series of rhythmic pulses at a high speed thereof, which is applied to the gates 16 and 17. Part of these pulses is transmitted during the time intervals as above defined and the respective counts thereof will be made in the pulse counters 18 and 19. Before any transfer authorization signal, a reset is applied to the counters from an output 20 of the time bases 14.

At the end of each counting period, a systematically occurring check enables the correction, when required, of the content of the counter 19 by means of a pulse issuing at 22 from the authorization signal for instance. If the check gives a positive result, a correction of the content of 19 is made as follows: Considering that the rough encoder is adjusted for a slight delay with respect to the accurate encoder, it is imperative that, when the highest weight digit in 18 is 1, whereas the lowest weight digit in 19 is 0, a lowest weight unit be added to the content of 19, and conversely when the highest weight digit in 18 is 0 whereas the lowest weight digit in 19 is 1, a lowest weight unit be also added to the content of 19.

In other words, the first and lowest weight digit in 19 must always be the same as the highest weight digit in 18. The check of identity of the said digits is made at 24 and the output thereof is applied to the input 25 of the counter 19. Considering the above-defined conditions, the circuit 24 operates an "exclusive OR" operation on the said digits of the counters 18 and 19, which is obviously the logical operation to be performed for the required result.

The counters 18 and 19 together constitute a static register for the code of the numerical quantity which measures a true and present position between the tool and the blank. As it is well known per se, such a register may be read for delivering a coded pulse train representative of its contents. The reading-out will be effected by a control signal from an output 26 of the time bases 14 and at 30, the same signal will read-out a prediction result from the interpolater 32. On the drawing, 31 refers to the control of the interpolater and 33 to the connection which controlled the operation of the said interpolater prior to such a reading out process. The quantity issuing from the interpolater represents a future position in the machining of the blank by the tool.

As it will be herein after explained, the register which, in the interpolator, contains the prediction result is of the dynamic recirculating kind. The output thereof will be in the form of a coded pulse train. The reading-out of the static register 18—19 will be made through a static-to-dynamic converter 28—27 and the pulse train issuing therefrom will be in phase with that issuing from the interpolater result register. Both pulse trains are applied to respective inputs of an adder 29 and the result of the addition, one of the input trains is representative of the two's complement of the quantity carried thereby) represents the span between the present measured position and the predicted position for the machine-tool. This difference is registered at 34 which 34 is a static register.

A decoder 35 is connected to the register 34 and converts the numerical content thereof into an analogue voltage for the speed control of the meter 9, but this voltage also includes a position corrective instruction due to the manner in which it has been obtained. The said voltage is applied to the control servo-mechanism 36 of the said motor drive which is not otherwise shown as it may be of any well-known form for the purpose.

The numerical content of 34 determines the instruction for controlling the speed of the motor 9 but the speed modulus (as herein before defined)—the value of the unit step of the control—is obviously determined by the reference voltage applied to the decoder 35. In a decoder for a binary register, each registering stage of the register has a determined weight and controls, in the decoder, when the registered digital value is 1, the addition to the output voltage of the said decoder of a voltage component proportional to the said weight. All the elementary weighing circuits are fed from a single electro-motive force, usually of a D.C. character. It is the voltage of the said E.M.F. which may be said to be the reference voltage as it defines the voltage step from each digital value. In the application of such a decoder in the present system, such a reference voltage may be varied or adjusted in order to vary the scale of the speeds of the controlled motors according to a predetermined kind of machining for instance. The reference voltage may for instance be made higher for rough machining than for fine machining, but further the speed scale may be varied during a single operative pass in order to adapt the work of the tool to the shape of the piece to be obtained. Manual adjustment may be made for this purpose, for instance by introducing from a manual control a value of reference voltage into a store 46 for controlling the decoder at 47. But, in a system according to the invention further, such an adjustment may be made from the recorded program and the content of the store 46 read over a connection 48 by an instruction coming from the said recorded program. The content of the store may for instance be decoded and the decoded voltage therefrom act for instance upon the setting of a potentiometer across which is applied the maximum voltage of the reference source, and from the slider of which the adjusted voltage is applied to the decoder 35.

The data processed by the interpolator 32 are introduced therein in the order of sequential reading out of the recorded medium 41, for instance a punched tape, passing through a reader 40. Such a reader may include a plurality of reading heads 39 each one of which is adapted to read out a signal bit from the recorded program word which is placed before it, as the said tape moves through the said reader. The movement of the tape is controlled from the time bases 14 by means of periodical signals issuing therefrom at 42. For each new reading of the tape, the interpolator must see some of the content thereof, at least, changed and consequently the control signal issuing at 42 is also used for clearing up those parts of the interpolator which must receive fresh datas, prior to their reshaping at 43 for the control of the driving mechanism of the tape reader 40.

The block shown at 38 is a routing circuit for the signals from the tape. The structure thereof will not be herein detailed but is apparent when it is considered that it merely includes routing circuits of any suitable kind, either controlled by timing signals from the time bases 14 and/or by parts of the signals which are read from the tape and act as tags for comparison with tags recorded in 38 so that coincidences therebetween open the suitable paths to the information signals towards the interpolator and so on. As it will be herein under detailed, the interpolator 32 includes a plurality of registers. When a fresh data must be introduced for instance in the register I of the interpolator, see FIG. 2, the resetting of the said register I will be effected from an output lead $49_1$ of the routing equipment 38. As said, it will be from the output 48 of the said equipment 38 that, when required, the numerical value of the reference voltage will be transferred to the store 46. From the said routing equipment, another store 44 may be filled, by a special instruction of the recorded program on the tape, for determining the character and/or number of interpolating operations which must be made by the interpolator 32 between two inputs of data to the said interpolator. At 45 is shown the input of the time bases for such an information.

The consistency of the informations on the program tape is ensured by the programmer and it must be noted that both the value of the reference voltage and the number of interpolations, stores 46 and 44, are common to all the drive paths of the machine-tool. Only the initial positions differ and the numerical quantities for the interpolators (as many interpolators as there are paths of movement in the machine-tool). The time bases 14 are common for the complete system and the synchronism is ensured both from the said time bases and from the constitution proper of the recorded program.

Figure 2:
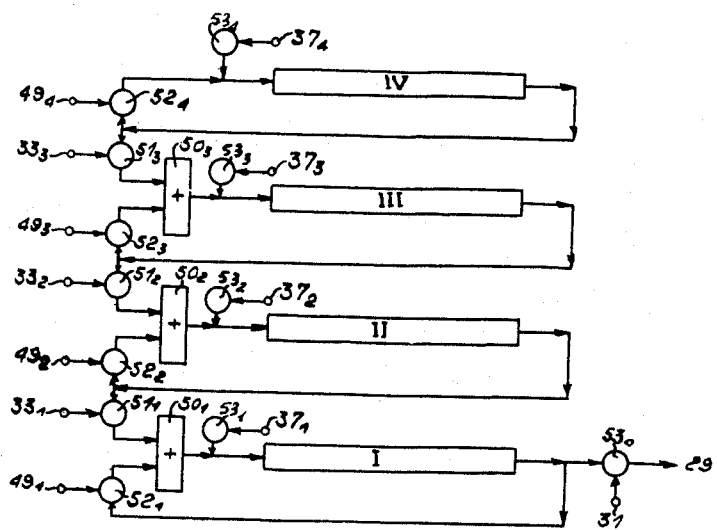
FIG. 2 shows a circuit diagram of an interpolator for the control system of FIG 1, in accordance with the above-described interpolation process.

Referring back to the method of interpolation which has been detailed, a structure of an interpolator for effecting the computations therein defined is shown in FIG. 2. The said interpolator comprises four dynamic registers or stores, I, II, III, IV. Each stored "word" recirculates therein through a recirculating loop closed through a maintenance gate 52. Clearing one of the stores is ensured by closing the gate 52 thereof during the time interval of the recirculation therein which is effected by an inhibiting signal applied at 49. Fresh information may be introduced through input gates 53 receiving the information through the connections 37 from the routing equipment 38.

The loops of the stores I, II and III further contain adders 50. One input of such an adder 50 receives the output from the maintenance gate 52 and the other input of the said adder receives the output of a further gate 51. The said input of the adder $50_1$ receives from the gate $51_1$ thereof, when the said gate $51_1$ is controlled therefor from an input control signal at $33_1$, the content of the store II to the recirculating loop of which is connected the input signal of the gate $51_1$. Similarly the adder $50_2$ has one input thereof connected to the output of a gate $51_2$ the input of which is connected to the recirculating loop of the store III, and the adder $50_3$ has one input thereof connected to the output of a gate $51_3$ the input of which is connected to the recirculating loop of the store IV.

An output gate $53_0$ is branched off the recirculating loop of the store I so that, when a control signal is applied from the time bases 14 to the control input 31 of the said gate, the content of the store issues at 29.

At the beginning of a cycle of operation, the store I receives a digital information from the program tape, the said information being $x^0$, the coordinate value of the initial position of the tool with respect to the blank for the corresponding coordinate of the interpolator. The store has been cleared by the clearance signal incoming at $49_1$, and, as in any recirculating store, the introduction of a fresh content may be coincident with the clearance of the old one.

The introduction of digital information from the tape into the store I at the beginning of a cycle of operation suffices per se. However, it may be considered by the programmer that some checks of the positions predicted by the interpolator may be made during the said cycle of operation. The programmer will then insert such positions to be checked in the program. Such informations will not be introduced in the store I but applied to a comparison circuit (not shown) receiving the output of the store I on another input thereof: a suitable comparison circuit to this purpose may consist of an intersection circuit between the items of informations so that if an error has occurred, the output of the said intersection circuit will actuate an alarm for instance, or even correct the content of the store I, such a kind of checking arrangement is well known in the computation technique.

The informations of the program consist of the quantities $\Delta$, $\Delta^2$, and $\Delta^3$, as herein above defined. Each time the program tape is read, the said informations are respectively introduced into the stores II, III and IV of the interpolator. Simultaneously the old contents of the said stores are cleared.

Theoretically, the content of the store II may not be modified by fresh introductions from the start of the cycle as, from the computation proper, the content of the said store II is always in the proper value for the interpolation operation at any time thereafter. However it appears preferable to change the said content from the program in order to avoid cumulative errors of "round-off" in the operation of the interpolator.

Each time an interpolation computation occurs, the gates 51 are rendered operative to add the content of the store IV to that of the store III, the content of the store III to that of the store II and the content of the store II to that of the store I. In this respect, the computation follows the Table I. After each of the computation operations, the gate $53_0$ is controlled for the readout of the content of the store I herein above detailed.

It may be noted that when, at certain times of operation, the gates $51_3$ and $51_2$ are not controlled for transferring the contents of the stores IV to III and III to II, but the gate $51_1$ is controlled for transferring the content of the store II to the store I, the interpolation process is made linear. This is apparent when referring to the relations defining the interpolation process, only the first derivative is maintained in the said relations. The manner in which such a linear interpolation may be used without losing the advantage of the invention will be herein after disclosed with reference to FIG. 3.

The store I may only have a reduced capacity, just sufficient for the derivation of the final analog voltage as explained. But, in actual practice, it will be better to ensure such a reduction of capacity within the store 34 of the difference between the predicted and measured positions. This point will be discussed later in the disclosure. In any case, the stores III and IV must have a relatively large capacity, viz. with a number of lower digits of lower weights than those of the lower digits of the stores II and I, so that cumulative round-off errors may be avoided. Of course, when the content of the store IV is transferred to the store III, the lower digits thereof are not transmitted therein if they correspond to digital weights not admitted in the said store III, and the same will be true for the transfer of the content of the store III to the store II.

Figure 3:
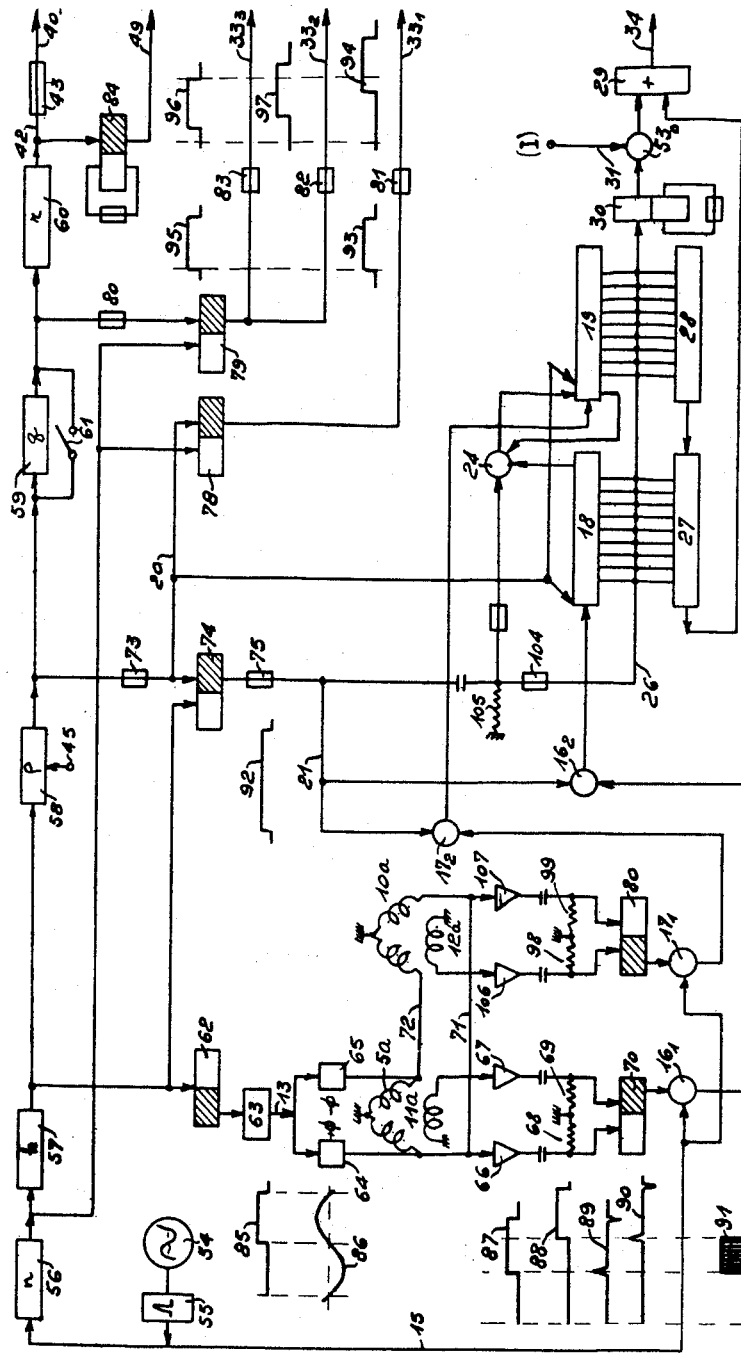
FIG. 3 shows an illustrative embodiment of the time bases and control circuitry of the system of FIG. 1, including the resolvers which, in the concerned example, are used for reading the true and present positions of the tool and the blank each time a predicted position is computed in the interpolator.

Referring now more particularly to FIG. 3, the time bases 14 are therein detailed as follows:

54 is a high frequency oscillator for instance a quartz-controlled oscillator, the output of which feeds a pulse shaper 55 which delivers the fast timing pulses of the computer. The frequency of these fast timing pulses is for instance equal to 3500 c./s. A frequency divider 56 receives these fast pulses and reduces the frequency by a ratio $n$, for instance 16. The pulses issuing therefrom are for instance the synchronising pulses of the "words" within the computer. A further frequency divider 57, of a ratio $k$ for instance 2, divides the frequency of the pulses issuing from 56. The output pulses therefrom are used for synchronising the readings of the measured positions of the tool. A further cascade of frequency dividers, 58 and 59, receives the pulses from 57 and delivers a series of pulses of a frequency divided by a ratio $(p+q)$, $p$ being the division coefficient of 58 and $q$ being the division coefficient of 59. These latter dividers together constitute the generator of synchro-signals for the computing operations proper, viz. the encoding of the measured positions and the interpolation processing. Finally, a frequency divider 60, of a ratio $r=32$, delivers at 42 the signals controlling the drive of the program tape, through a delaying element 43, and the clearance of the stores IV, III and II of the interpolator (for instance from the control of an intermediate one-shot circuit 84 of suitable resetting time interval).

The connection 15 from the output of the pulse shaper circuit 55 extends to the inputs of two gates $16_1$ and $17_1$ so that these gates always receive the fast timing pulses of the computer time bases.

A derivation of the output of the frequency divider 57 drives a bistable trigger stage, or flip-flop, 62. The waveform collected in one of the plates of the said flip-flop, and shown at 85, is filtered in the circuit 63 so that the output of the said filtering circuit is substantially sinusoidal, as shown at 86. The frequency thereof is $F/2nk$, $F$ being the frequency of the pulses from 55. It is the output of the said filter 63, at 13, which constitutes the terminal of identical reference in the diagram of FIG. 1, for the supply of the resolvers 5—11 and 10—12.

The A.C. voltage from 13 is applied to a pair of phase-shifting networks 64 and 65. Network 64 introduces a phase lead equal to $+\phi=45°$, and network 65 introduces a phase lag equal to $-\phi=-45°$. These shifted voltages are applied to the double-phased windings 5 and 10 of the resolvers, in parallel relation from the connections 71 and 72 as shown. One of the phase-shifted voltages, for instance the one having a phase-lead of 45° is chosen as a phase-reference voltage, and is applied to a clipping amplifier 66 (for the accurate resolver) and a clipping amplifier 107 (for the rough resolver). The output waveform of such amplifiers is shown at 87. The variable phase voltage picked-up by the winding 11, for the accurate resolver, by the winding 12 for the rough resolver, is similarly applied to a clipping amplifier, 67 for the accurate resolver and 106 for the rough resolver. The output waveform thereof is shown at 88 and is out of phase with the first, the phase-shift depending upon the relative positions of the stator and moving part of the concerned resolver. The said waveforms are differentiated by conventional networks, 68—69 for the accurate resolver, and 98—99 for the rough resolver. The output waveforms are qualitatively shown at 89 and 90 on the drawing. With these derivative pulses the two flip-flops 70 and 80 are actuated and the gates $16_1$ and $17_1$ are controlled from respective outputs of the said flip-flops. These gates thus pass the fast timing pulses applied to their signal inputs during time intervals proportional to the respective phase-shifts between the input and output voltages of the resolvers. Consequently the number of fast timing pulses passing through each of the gates $16_1$ and $17_1$ will give a measure of the accurate and rough position of the tool with resect to the blank at the time of sampling of the resolvers, see the waveform 91 for the timing of the said sampling operation.

However each sampling will not be used in a system according to the invention, as the outputs of the gates $16_1$ and $17_1$ are respectively connected to inputs of the further gates $16_2$ and $17_2$ which are controlled from a signal 92 applied to the respective control inputs 21 thereof. This signal 92 comes from a flip-flop 74, through a protective delay 75, and the said flip-flop is actuated by the output of the frequency divider 58 through a protective delay 73, and reset by the output of the frequency divider 57. From 73 and through the connection 20, both counters 18 and 19 are reset before the transmission of pulses to their actuation inputs from the gates $16_2$ and $17_2$.

When the flip-flop 74 is reset, the trailing edge of the output voltage waveform thereof is differentiated at 105 and the pulse therefrom, slightly delayed as shown, controls the activation of the circuit 24. This circuit 24 consists, as said, of an exclusive-OR circuit between the digital values of the highest digit of counter 18 and the lowest digit of counter 19. When the said digital values are not the same, the circuit 24 delivers a pluse which is additionally introduced in the counter 19 so that the required condition is met.

The same input pulse from 105 is further delayed at 104 and applied for reading-out the counts in 18 and 19 by controlling the parallel transfer of such counts into the static-to-dynamic converters 27 and 28. An output pulse train representative of the measured position is thus applied to one input of the adder 29, whereas the other input out the said adder receives the pulse train issuing from $53_0$ from the store I of the interpolator. The in-phase condition of these pulse trains is ensured by controlling the gate $53_0$ from a one-shot circuit 30 actuated from the pulse reading-out the counters 18 and 19. The pulse train of the measured position actually carries the complement of the counts of 18 and 19 and such a complementation is obtained for instance in the transfer of the counts into the static-to-dynamic converters 27—28.

The result of an interpolation operation has been previously obtained as follows: The output of 58 has actuated a flip-flop 78 and the output signal therefrom, 93, delayed at 81, has appeared as the signal 94 to the input connection $33_1$ of the interpolator. Consequently, FIG. 2, the content of the store II of the said interpolator has been applied to the adder $50_1$ and the content of the store II has been added to that of the store I. The flip-flop 78 is reset by the synchro signal issuing from the frequency divider 56.

When the short-circuit 61 is closed around the frequency divider 59, the same pulse from 58 which actuates the flip-flop 78 actuates, through the delaying element 80, the flip-flop 79, which will be reset by the same signal as 78. The said flip-flop 79 delivers an output signal 95 identical to 93 in one of the plates thereof. Through separate delays 82 and 83, the said signal appears as 97 and 96 at the control terminals $33_2$ and $33_3$ of the interpolator so that the gates $51_2$ and $51_3$ are controlled for adding firstly the content of the store IV to that of the store III and secondly the content of the store III to that of the store II. The operation of the interpolator will strictly conform to the Table I supra.

When, on the other hand, the short-circuit 61 is not closed around the frequency divider 59, the flip-flop stage 79 will only be actuated one time every $q$th operation of the flip-flop 78. Consequently, in such a condition, the interpolation process will be linear for $q-1$ times, cubic the $q$th time, and so forth, as for each one of the said $q-1$th operations, only the content of the store II will be added to the content of the store I. The said short-circuit 61 may be manually operated so that, for instance, it is only closed for a fine cycle of machining and not for a rough cycle of machining. The short-circuit 61 may be placed under the control of program instructions from the tape, the orders contained in such instructions being stored in a special store from which the short-circuit 61 has the condition thereof controlled by a decoding process for instance. when $p=16$ and $q=4$, for instance, the interpolator processes with one cubic interpolation then three linear interpolations, and so forth when the short-circuit 61 is not applied to 59.

As herein above stated, the number $p$ will advantageously be adjustable by program instructions, thus varying the number of interpolations between any interval of introductions of successive digital informations from the tape.

It has been stated that the register 34 from which is finally obtained the control voltage of the motor 9 may preferably be of a capacity of digits reduced with respect to the number of digits of the pulse train incoming thereto, such an arrangement being preferred to the one consisting of a reduction of the number of digits in the pulse trains incoming to the adder 29. This may be obtained by inhibiting the input of the register store 34 in any case after a certain number of digits has entered therein from the output of the said adder. But in such a plain arrangement, the control system operates with the lower digits of the result pulse train from 29, in other words it operates for a fine cycle of machining. It is obviously of advantage that it may operate in a different fashion for a cycle of rough machining. Actually changes of accuracy may be obtained by introducing into 34 a set of digits differently selected from the complete output of the adder 29 according to the required working condition. Such a control may apparently be obtained from special instructions of the program and an instruction to such a purpose will be stored as the other internal control instructions. The control of such a store will be applied to a gate between the output of the adder 29 and the result store 34 and not to a gate placed before the adder as, in such a case, the lower digits therefrom will be lost and may introduce errors in the lower digits of the number finally stored in 34. Of course, in such a condition of variable use of the results of measurements and interpolations, the digital capacity of the counters and the dynamic stores of the interpolator remains relatively high. The digital capacity of the stores in the interpolator may be reduced by means of a special coding of the program informations so that the interpolations occur in various parts of the said informations. As regards the counters making part of the measurement equipment, it appears preferable to preserve the full capacity thereof in order to avoid intricate control systems for shifting their contents in accordance with the virtual shifts in the interpolator from the program instructions and informations. But there may be provided in the said program, special instructions which are stored in the computer and defines the point of the static-to-dynamic converters from which the said contents may be read so that their digital places of output pulse train coincide with the digital places of the pulse trains from the store I of the interpolator. When for instance the said static-to-dynamic converters include an electromagnetic delay line terminated upon the characteristic impedance thereof at one of its ends, the digits from the counter stages are introduced through as many taps distributed along the said delay line. Instead of systematically issuing the read-out pulse train from the other end of the said line, the said weight control store will determine at which intermediate output tap of the said delay line the measurement pulse train is taken and applied to the corresponding input of the adder 29, in correspondance to the lower weight of the digital pulse train then issuing from the interpolator.

In actual operation of the interpolator, the store I must not have its digital capacity exceeded by a transfer of the content of the store II through the gate $50_2$. This drawback may be easily avoided by providing the inhibition of any superfluous digit from a suitable control of the adder $50_1$ or of the gate $51_1$. For instance, in the latter case, the loop of the store I will be made with an extra digital place and the gate $52_1$ inhibited for such an extra digital period from a signal issuing from the control circuits of the computer. It is apparent that in the said control circuits, such auxiliary means as inhibitors have not been shown in order to not overload the drawings with information which is not necessary for a clear understanding of the invention proper.

In the following claims, a "digital control system for machine-tool of the kind specified" will be used for representing a control system wherein any program of machining cycles is made as a sequence of coded informations carried by a medium which may be automatically read through mechanical means, for feeding a digital computer working on the said informations and instructions and also on coded informations from measurements of the relative positions of the tool and the blank during any cycle of machining thereof, said computer comprising, inter alia, an interpolator operating between any pair of time instants of introduction of fresh informations in the computer from the said program carrying medium, the coded informations resulting from the handling of such informations within the said computer controlling analog voltage forming means for the actuation of servo-mechanisms controlling the speeds of rotation of the drive motors of the said machine-tool.

What is claimed is:

1. A digital control system for controlling relatively movable first and second cooperative elements of a machine of the kind which includes a control equipment responding to signals from a recorded program of instructions to control the speed of a drive motor for one of said elements, the combination of interpolator means controlled by sets of signals supplied at intervals from said program and delivering for each set of signals a timed sequence of digital signal codes derived from said program signals according to a predetermined law and representing predicted future positions of coincidence between the said elements, means producing digital codes representing present positions of the movable elements, a digital code comparator responding to said future position and present position codes and deriving therefrom a digital difference code representing the difference between said predicted and present position digital codes, and a circuit deriving from the said digital difference code an analog voltage which is added to the speed-controlling voltage of said drive motor, and wherein the parametric relation between the movable elements in the direction of drive of the one element being:

$$x_{(1,p)} = x_i + p \cdot \Delta x_i + \frac{p(p-1)}{2} \cdot \Delta^2 x_i + \frac{p(p-1)(p-2)}{6} \cdot \Delta^3 x_i$$

$x_i$ denoting the initial value of the variable in the concerned path of drive of the one element, and $p$ denoting the interpolating parameter $\Delta x_i$, $\Delta^2 x_i$ and $\Delta^3 x_i$ denoting predetermined functions of the first order, second order and third order derivatives of the variable $x$, which are precomputed and recorded in the program so as to ensure automatically the continuity of the relative curve between the movable elements and wherein the said interpolator contains as many registering stores as there are terms in such a relation, each store being provided with an input circuit for numerical information from the program and an output gate, the said stores being interconnected in cascade relation through the said output gates for progressive transfers of their contents under the control of the said central equipment wherein the value of the interpolation parameter $p$ is stored and wherein control signals are simultaneously formed for controlling the operation of the said interpolator and of reading-out devices of the present positions of the movable elements, the simultaneously effected reading-out of the results of interpolation and measurement, the subtraction therebetween and the entering of the result into a digital store.

2. A digital control system according to claim 1 wherein the said control equipment includes a member settable to either one or the other of the two positions and means controlled by said member in one of the said positions for controlling the operation process of the said interpolator so that all the additive transfers between the stores thereof are made at any time and being operative in the other one of the said positions for controlling $(p-1)$th times amongst $p$ times the transfer of the content of the last but one store only to the last one in the said interpolator.

3. A digital control system according to claim 1 and wherein the measurement equipment for the path of drive of the one element comprises a pair of encoders, one delivering a digital code of rough measurement along the direction of the said drive path and the other one producing a digital code of accurate measurement of position of the one element along the said path, a common registering store for the said codes and means for effecting a read-out of the complete measure from a sequential read-out of the said common registering store.

4. A digital control system according to claim 3 and wherein the said read-out means comprises an exclusive-Or circuit operating between the digits of highest weight of the digital code of accurate measurement and of lowest weight of the digital code of rough measurement and the output of which increases by one unit of smallest weight the digital code of rough measurement when the said digits are not the same.

5. A digital control system according to claim 3 and wherein each one of the said encoders comprises an inductive resolver having a stator supplied with an attenuating voltage derived from the main timing pulse source of the control equipment and a rotor winding connected to control the operative condition of a gate receiving the faster timing pulses of the time bases in the said control equipment, for transmission through said gate timing pulses proportional to the phase-shift between the stator and rotor parts of the resolver to a counter forming part of the said common store each time the said control equipment also controls an interpolation operation in the corresponding interpolator of the computer.

6. A digital control system according to claim 1 and wherein the said digital code comparator has a registering store of a digital capacity restricted with respect to the number of actual digital places of the said digital difference code.

7. A digital control system according to claim 6 and wherein the said registering store of the comparator is provided with a decoder converting the content thereof into an analog voltage representative of the said content and the said analogue voltage is applied to the input of the servo-mechanism controlling the speed of rotation of the corresponding drive motor of the one element, and means are provided for separately controlling the voltage conversion ratio of the said decoder.

8. A digital control system according to claim 7 and wherein the said voltage step controlling means comprises a store in the control equipment fed from special instructions from the recorder program of driving cycles.

9. A digital control system according to claim 1 and wherein the digital capacities of the stores of the interpolator are progressively less from the first to the last one of the said store in the said cascade.

10. A digital control system according to claim 1 and wherein each one of the stores in the interpolators is of the recirculating kind.

References Cited in the file of this patent

UNITED STATES PATENTS

| | | |
|---|---|---|
| 2,537,427 | Seid et al. | Jan. 9, 1951 |
| 2,628,539 | Neergaard | Feb. 17, 1953 |
| 2,704,012 | Trinkle | Mar. 15, 1955 |
| 2,736,852 | Nelson | Feb. 28, 1956 |
| 2,741,732 | Cunningham | Apr. 10, 1956 |
| 2,784,359 | Kamm | Mar. 5, 1957 |
| 2,792,545 | Kamm | May 14, 1957 |
| 2,833,941 | Rosenberg et al. | May 6, 1958 |
| 2,887,638 | Cail et al. | May 19, 1959 |
| 2,927,258 | Lippel | Mar. 1, 1960 |